United States Patent [19]

Atago et al.

[11] 4,363,209
[45] Dec. 14, 1982

[54] AIR-FUEL CONTROL METHOD AND APPARATUS FOR INTERNAL COMBUSTION ENGINE

[75] Inventors: Takeshi Atago, Katsuta; Taiji Hasegawa, Nakaminato, both of Japan

[73] Assignee: Hitachi, Ltd., Tokyo, Japan

[21] Appl. No.: 161,153

[22] Filed: Jun. 19, 1980

[30] Foreign Application Priority Data

Jun. 27, 1979 [JP] Japan .................................. 54-80159

[51] Int. Cl.³ ...................... F01N 3/22; F02B 75/10; F02M 7/24
[52] U.S. Cl. ....................................... 60/274; 60/276; 60/285; 60/289; 60/290; 123/440
[58] Field of Search ................ 60/274, 276, 285, 289, 60/290; 123/438, 440

[56] References Cited

U.S. PATENT DOCUMENTS

| | | | |
|---|---|---|---|
| 3,759,232 | 9/1973 | Wahl | 60/276 |
| 3,832,848 | 9/1974 | Scholl | 60/285 |
| 3,869,858 | 3/1975 | Goto | 60/290 |
| 3,970,060 | 7/1976 | Sasano | 123/438 |
| 4,107,920 | 8/1978 | Minami | 60/276 |
| 4,119,072 | 10/1978 | Asano | 60/276 |
| 4,135,482 | 1/1979 | Bier | 123/440 |
| 4,149,376 | 4/1979 | Masaki | 60/276 |
| 4,179,882 | 12/1979 | Mitsuda | 60/276 |
| 4,271,667 | 6/1981 | Mitsuda | 60/276 |

FOREIGN PATENT DOCUMENTS 1446606 8/1976 United Kingdom ................ 123/438

*Primary Examiner*—Douglas Hart
*Attorney, Agent, or Firm*—Antonelli, Terry and Wands

[57] ABSTRACT

An air-fuel ratio control apparatus for an internal combustion engine comprises a carburetor for controlling the air-fuel ratio of the fuel-air mixture supplied to the engine, a thermal reactor in which the exhaust gas from engine is caused to undergo reaction with secondary air supplied to the reactor, an oxygen sensor disposed in an exhaust gas passage between the reactor and three-way catalyst, a negative pressure generator for producing a negative pressure corresponding to the output from the oxygen sensor, a detector for detecting a low and a high speed operation region of the engine, and means for controlling a low speed fuel system and a main fuel system, respectively, of the carburetor in response to the negative pressure in such a manner that the fuel-air mixture is enriched with the secondary air supply being concurrently increased in the low speed operation region of the engine, while in the high speed operation range the fuel-air mixture having an approximately stoichiometric air-fuel ratio is supplied to the engine. A method of controlling the air-fuel ratio controlling apparatus is also disclosed.

8 Claims, 9 Drawing Figures

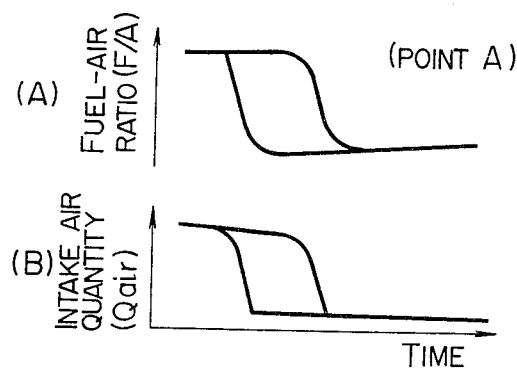
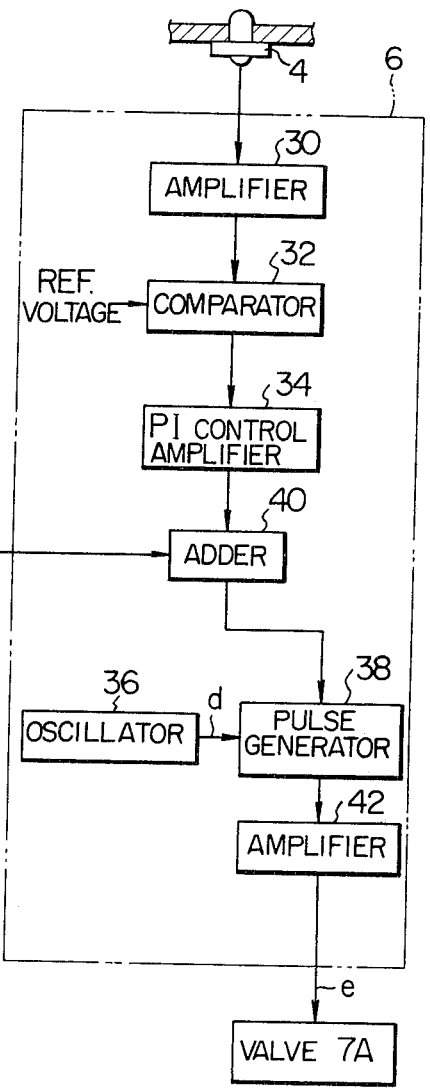
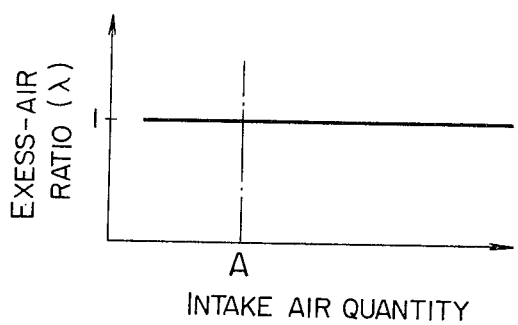

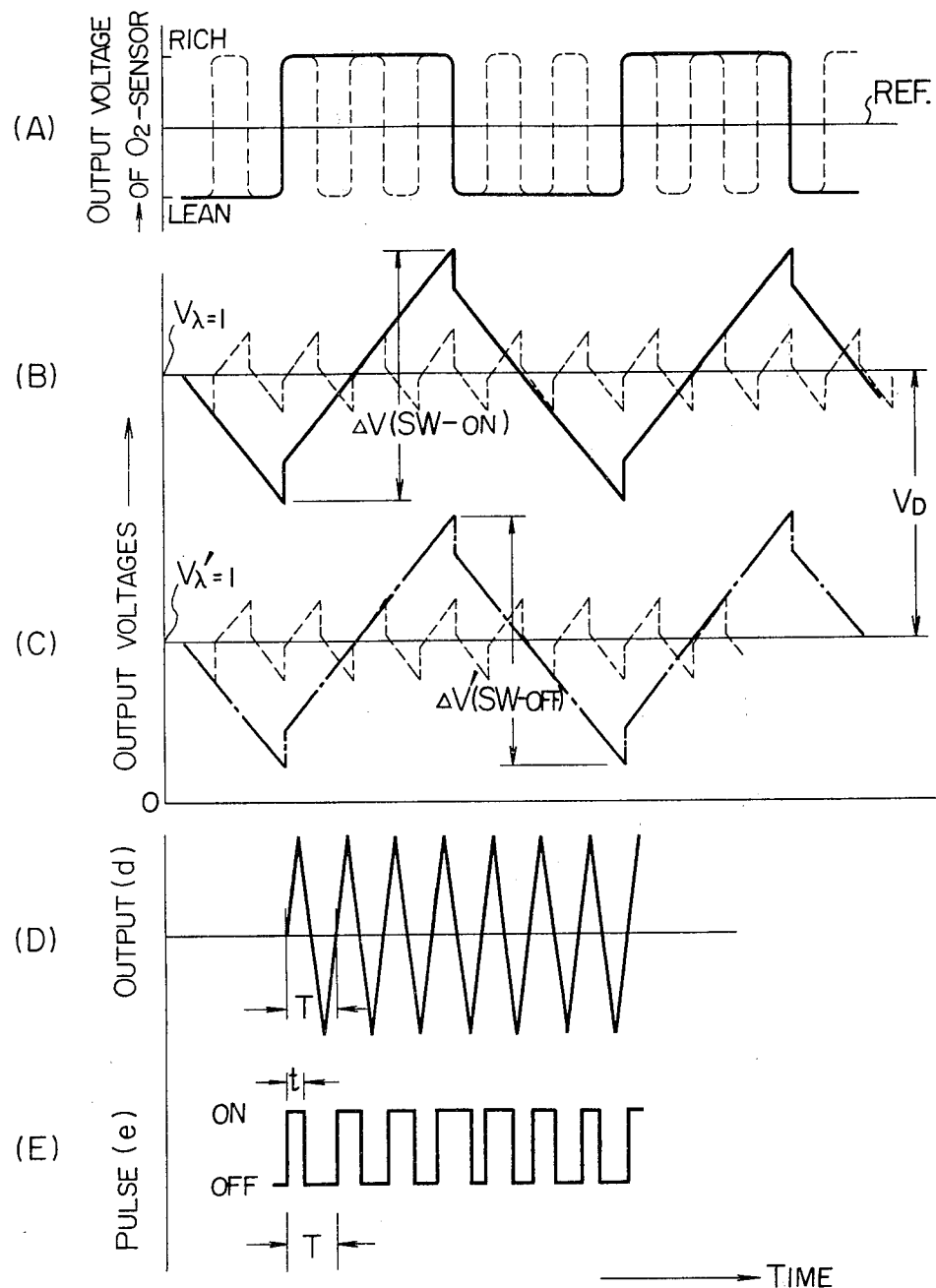

AIR-FUEL CONTROL METHOD AND APPARATUS FOR INTERNAL COMBUSTION ENGINE

FIELD OF THE INVENTION

The present invention relates to a method and an apparatus for controlling the fuel-air ratio of the fuel-air mixture supplied to an internal combustion engine provided with a thermal reactor and destined to be used for motor vehicles or the like.

BACKGROUND OF THE INVENTION

There has hitherto been used an internal combustion engine provided with a thermal reactor, in which exhaust gas discharged from the engine is caused to undergo re-combustion with secondary air in order to purify the exhaust gas discharged from the engine of the motor vehicle. In an internal combustion engine equiped with such a reactor, it is intended to enrich the fuel-air mixture supplied to the engine to a certain degree, to thereby enhance the operation performance of the engine while purifying the exhaust gas finally discharged to the atmosphere in a low speed rotation region of the engine. However, the hitherto known apparatus of this kind does not exhibit the desired and expected functions to a satisfactory degree and has encountered difficulty in assuring a stable operation, particularly in the operating state in which the intake air quantity is reduced from the standpoint of exhaust gas purification. A typical internal combustion engine which is operated with an enriched fuel-air mixture in the low speed rotation region, is a rotary engine.

U.S. Pat. No. 3,827,237 discloses a fuel-air ratio control method according to which the quantity of secondary air supply is controlled as a function of temperature of the thermal reactor while the fuel supply quantity is controlled in dependence on the output signal from an oxygen sensor. However, because the secondary air supply is not controlled by the very oxygen sensor that serves for controlling the fuel supply quantity but in dependence on the output signal from the other sensor destined from detecting the temperature of the reactor, the control system of the prior art cannot maintain in the intake system of the engine the fuel-air ratio which assures an optimum operating condition with a reasonable accuracy.

SUMMARY OF THE INVENTION

The present invention provides a method and an apparatus for controlling the air-fuel ratio of a fuel-air mixture supplied to an internal combustion engine equiped with a reactor which allows the engine to be operated in a stable manner while assuring constantly and positively purification of the exhaust gas over the entire operation range from a low speed to a high speed rotation region, by supplying a fuel-air mixture which has a lower air-fuel ratio (A/F) than the stoichiometric air-fuel ratio in the low speed rotation region of the engine operation.

According to an aspect of the invention, there is proposed an air-fuel ratio control apparatus for an internal combustion engine which comprises a carburetor for controlling the air-fuel ratio of the fuel-air mixture supplied to the engine, a reactor in which the exhaust gas from the engine is mixed and reacted with secondary air, an exhaust gas composition sensor disposed in an exhaust passage between the reactor and a three-way catalyst tube, a negative pressure system for producing a negative pressure corresponding to the output signal from the exhaust gas composition sensor, means for controlling a low speed fuel system and a main fuel system of the carburetor, and means for controlling the secondary air supply, whereby the composition of the exhaust gas flowing through the three-way catalyst tube is controlled so as to be substantially invariable.

BRIEF DESCRIPTION OF THE DRAWINGS

FIG. 6 graphically illustrates the fuel-air ratio of a fuel-air mixture supplied to the internal combustion engine in comparison with the secondary air supply from an air pump.

FIG. 7 graphically illustrates the relationship between the air number (excess air ratio) detected by an oxygen sensor employed in the apparatus shown in FIG. 1 and the intake air quantity.

FIG. 8 is a block diagram to illustrate in some detail the circuit arrangement of a control circuit employed in the apparatus shown in FIG. 1.

FIG. 9 shows signal waveform diagrams for illustrating operations of the control circuit shown in FIG. 8.

DESCRIPTION OF THE PREFERRED EMBODIMENTS

Figure 1:
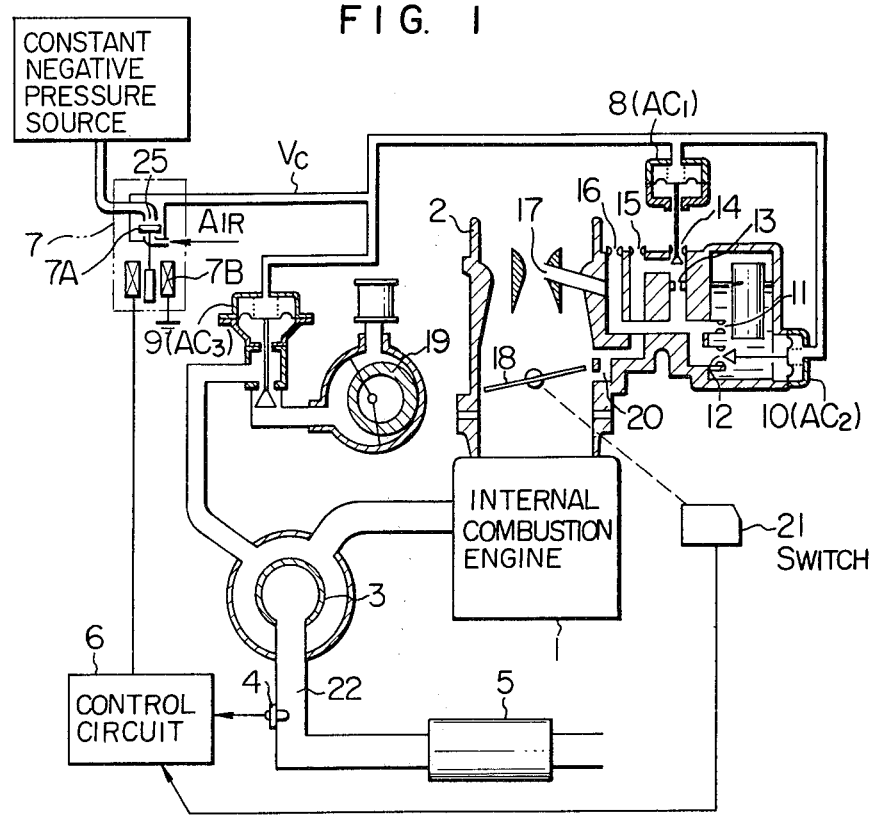
FIG. 1 shows schematically the general arrangement of an air-fuel ratio control apparatus according to an embodiment of the invention.

Referring to FIG. 1, an internal combustion engine 1 is supplied with a fuel-air mixture from a carburetor 2 for operation. The air-fuel ratio of the mixture is controlled in the manner described below. The carburetor 2 is equipped with a low-speed fuel system for a low speed operation in combination with a main fuel system. In the low-speed fuel system, a quantity of fuel metered through a slow jet orifice 13 is mixed with air sucked or drawn in through a slow air bleed 15 and a bypass slow air bleed 14 and then fed into a suction passage through a slow port 20. The quantity of fuel of the fuel-air mixture can be controlled by adjusting the opening area or aperture of the bypass slow air bleed 14 by means of a slow actuator 8 ($AC_1$). On the other hand, the main fuel system serves to mix a quantity of fuel metered through a main jet 11 and a bypass main jet 12 with air sucked through a main air bleed, whereby the resultant fuel-air mixture is fed to the suction passage through a main nozzle 17. The quantity of fuel introduced through the main fuel system of the carburetor 2 can be controlled by adjusting the opening area of the bypass main jet 12 by means of a main actuator 10 ($AC_2$). When the operating condition of the engine 1 is to be changed by varying the opening degree or aperture of a throttle valve 18, the main fuel system and the slow-speed fuel system cooperate with each other to thereby control the air-fuel ratio of the mixture supplied to the engine 1.

The fuel-air mixture thus supplied to the engine 1 undergoes combustion and is then discharged into a thermal reactor 3 which is supplied with air from an air pump 19 through a secondary air actuator 9 ($AC_3$). Accordingly, the quantity of air supplied to the reactor 3 can be controlled by adjusting the opening degree of the secondary air actuator 9.

The composition of the exhaust gas which has undergone recombustion in the reactor 3 is detected by an oxygen sensor 4 which is disposed in an exhaust manifold 22. Thereafter, the exhaust gas is discharged to the atmosphere through a three-way catalyst tube 5 which is filled with a three-way catalyst. The characteristic of this catalyst is selected such that the exhaust gas can be purified most satisfactorily when the air-fuel ratio (A/F) of the fuel-air mixture supplied to the engine 1 is at a predetermined value (generally, 14.7). In other words, by controlling the air-fuel ratio so that the exhaust gas has a composition for which the three-way catalyst can exhibit the maximum possible efficiency, the amount of toxic or poisonous substances of the finally discharged exhaust gas can be reduced to a minimum. Accordingly, the exhaust gas can be finally discharged in the most purified state either in a low speed region or in a high speed region through corresponding control of the slow actuator 8, the main actuator 10 and the secondary air actuator 9 of the carburetor 2 described above. In the following, the operations of these actuators will be described.

The output signal from the oxygen sensor 4 is supplied to the input of a control circuit 6; hereinafter described in detail; and processed therein in order to detect the oxygen concentration of the exhaust gas which is brought into contact with the oxygen sensor 4. In response to the signal from the oxygen sensor 4, the control circuit 6 supplies such a control signal to a negative pressure generator 7 which causes the air-fuel ratio of the fuel-air mixture supplied to the engine 1 to approach a desired value. The negative pressure generator 7 will then generate a negative pressure of a magnitude proportional to the input control signal to thereby operate the slow actuator 8, the main actuator 10 and the secondary air actuator 9 for controlling the composition of exhaust gas brought into contact with the oxygen sensor 4 in a feedback control loop. It should be mentioned here that the control circuit 6 is electrically connected to a throttle valve switch 21 which is interlocked with a throttle valve 18 so as to be operated at a predetermined position of the valve 18. The signal produced by the switch 21 represents the opening degree of the throttle valve 18. Thus, the control circuit 6 and hence the negative pressure generator 7 can follow rapidly variations in the operating state of the internal combustion engine 1.

Figure 2:
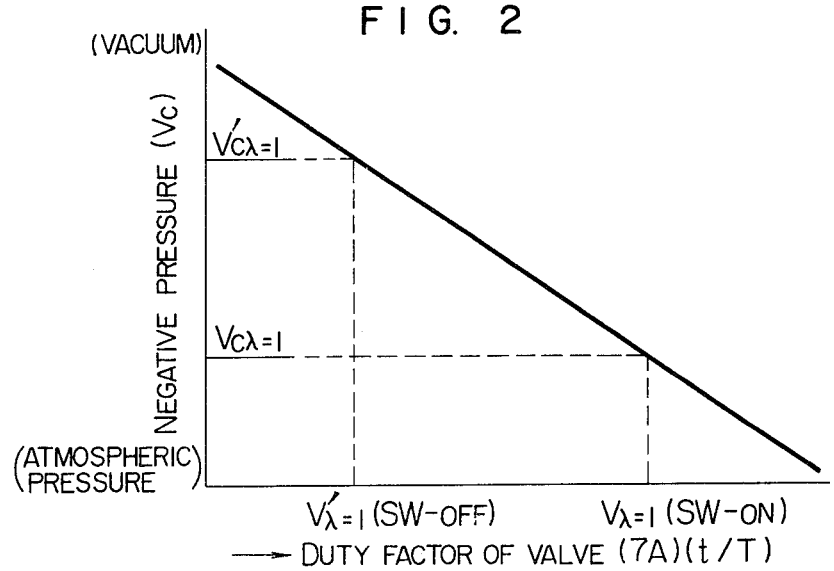
FIG. 2 graphically illustrates the characteristic of a negative pressure generator employed in the apparatus shown in FIG. 1.

Referring to FIG. 2 which graphically illustrates a characteristic of the negative pressure generator 7, there is plotted along the abscissa the ratio (t/T) between opening duration t of a valve 7A constituting a part of the negative pressure generator 7 and a period T of a predetermined length, while negative pressure valve $V_c$ is plotted along the ordinate. The duty factor t/T will be referred to also as the duty factor of the valve 7A. As can be seen from FIG. 1, the valve 7A is connected to a negative pressure source which is controlled so as to be constantly at a predetermined pressure. Such a negative pressure source itself has been previously known and is usually connected to the intake manifold of the engine. The negative pressure $V_c$ fed to the slow actuator 8, the main actuator 10 and the secondary air actuator 9 as described hereinbefore can be determined in dependence on the duty factor (t/T) of the valve 7A. In other words, by controlling the duty factor of the valve 7A of the negative pressure generator 7, a negative pressure output signal of a magnitude inversely proportional to the duty factor (t/T) can be obtained from the negative pressure generator 7 as shown in FIG. 2. The negative pressure generator may be constituted by what is commonly referred to as a three-way electromagnetic valve device.

Figure 3:
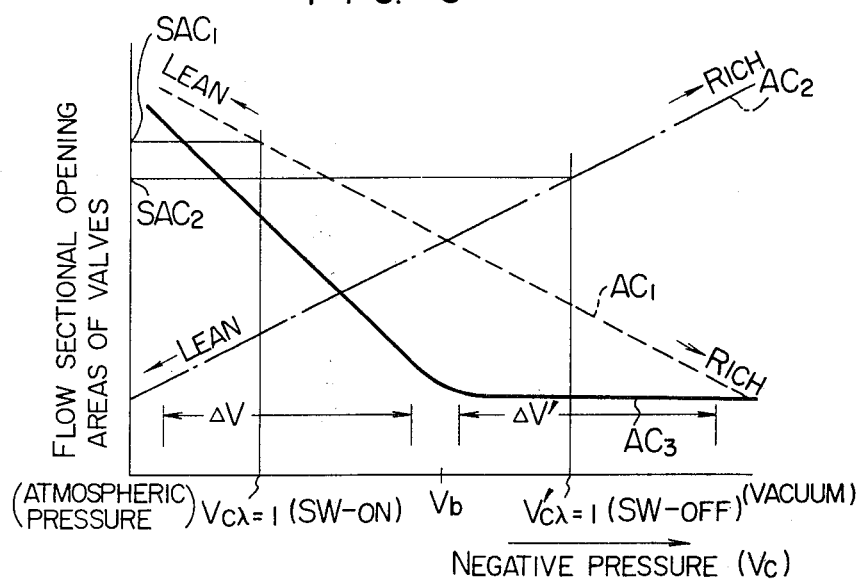
FIG. 3 graphically illustrates the characteristics of individual actuators employed in the apparatus shown in FIG. 1.

In FIG. 3 which graphically illustrates characteristics of the individual actuators, the negative pressure $V_c$ is plotted along the abscissa, while the opening area of the actuator is plotted along the ordinate. The negative pressure approaches a vacuum in the direction toward the right as viewed along the abscissa in FIG. 3. The broken line curve $AC_1$ represents the characteristic of the slow actuator 8. It can be seen that the opening degree or area of the bypass slow air bleed 14 is decreased in inverse proportion to the negative pressure as the latter is increased towards a vacuum, which means that the fuel quantity supplied from the low speed system is correspondingly increased. The dotted-broken line curve $AC_2$ represents the characteristic of the main actuator 10. As will be seen from this characteristic curve, the opening area of the bypass main jet 12 is increased as an increasing function of the negative pressure $V_c$, involving a correspondingly increased fuel quantity supplied from the main fuel system of the carburetor. The solid line curve $AC_3$ represents the characteristic of the secondary air actuator 9. The air flow supplied to the reactor 3 is caused to decrease in inverse proportion to the negative pressure $V_c$ until a predetermined value of the latter is reached. Each of the actuators is constituted by a diaphragm valve and has a valve element disposed so that the control in the intended direction can be assured. The characteristics of the individual actuators described above can be attained by appropriately selecting the valve element and the spring characteristic of the associated spring in design in addition to the disposition of the actuator relative to the negative pressure generator, as is well known in the art.

Figure 4:
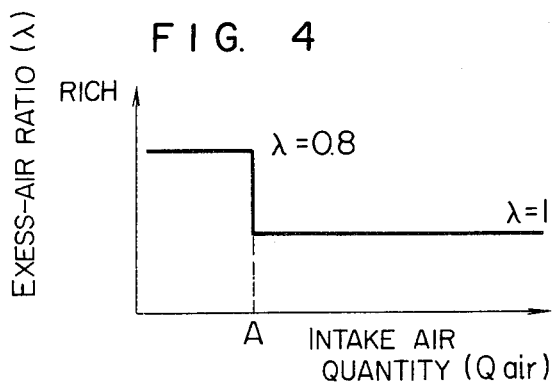
FIG. 4 graphically illustrates a performance characteristic of an internal combustion engine to which the air-fuel ratio control apparatus according to the invention can be preferably applied.

In FIG. 4 which graphically illustrates an operation characteristic of the engine 1, the intake air quantity $Q_{air}$ is plotted along the abscissa, while the excess air ratio is plotted along the ordinate. When the intake air quantity $Q_{air}$ is greater than a value A, the engine 1 can be operated in a desirable operating state, provided that the air number or exess-air ratio $\lambda$ is equal to 1 or alternatively the ratio is equal to 14.7. On the other hand, in a relatively low speed operation region in which the intake air quantity $Q_{air}$ is smaller than the value A, the desirable operating condition of the engine can be attained when the ratio $\lambda$ is of a higher value, e.g. $\lambda = 0.8$. As a typical internal combustion engine exhibiting the characteristic described above, there is a rotary engine, for example. In brief, this type of engine exhibits such characteristic that the preferable operating condition can be assured in a low speed region by enriching the fuel-air mixture to some degree.

In the region where the intake air quantity $Q_{air}$ remains small, the slow actuator 8 plays a dominant role in varying the air-fuel ratio. At that time, the opening area of the bypass slow air bleed 14 is enlarged by the slow actuator 8, as is illustrated in FIG. 3. Accordingly, the fuel quantity fed from the low speed system may appear small on the face of it in view of the characteristic illustrated in FIG. 3. However, the carburetor is so conditioned that the desired air-fuel ratio (e.g. λ=0.8) for the low speed operation is assured by controlling the opening degree of the actuator 8 at the negative pressure $V_{c\lambda=1}$ corresponding to the air number λ of 1. Thus, it is possible to feed a rich fuel-air mixture to the engine to satisfy the characteristic requirement of the engine illustrated in FIG. 4.

On the other hand, the secondary air actuator 9 is operated essentially in the low negative pressure range, as can be seen from FIG. 3. Accordingly, it is possible to effect the control such that the composition of the exhaust gas caused to pass by the oxygen sensor 4 results in that λ=1 by varying the secondary air quantity fed to the reactor 3. In the region where the intake air quantity $Q_{air}$ of the engine 1 is relatively large, the negative pressure $V_c$ supplied from the negative pressure generator 7 is higher than the level $V_b$. In this condition, the air-fuel ratio of the mixture supplied to the engine is controlled by both of the slow actuator $AC_1$ and the main actuator $AC_2$.

Figure 5:
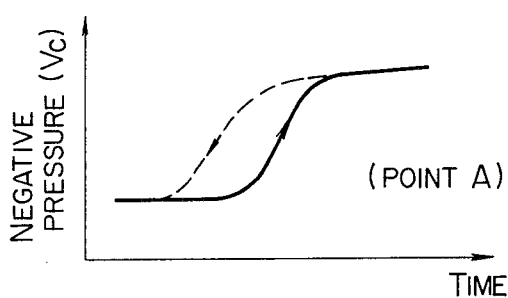
FIG. 5 is a graph to show a variation in the negative pressure around a point A shown in FIG. 4.

FIGS. 5 and 6 graphically illustrate a change in the negative pressure $V_c$ as a function of time at the point or level A shown in FIG. 4. The detection of the level A is effected by the throttle switch 21. More specifically, the switch 21 is closed (ON) when the intake air quantity is smaller than the value A and turned off when the former exceeds the latter. In other words, the switch 21 is changed over from the on-state to the off-state and vice-versa at the point A shown in FIG. 4. Accordingly, when the negative pressure undergoes an instantaneous variation at the value $V_b$, the air-fuel ratio of the mixture supplied to the engine will vary abruptly. Since such an abrupt change of the air-fuel ratio degrades the comfortable ride of the motor vehicle, a time delay is provided in operation of the negative pressure generator 7. In other words, even when the position of the valve 7A is changed abruptly, the variation involved in the negative pressure $V_c$ is buffered. Referring to FIG. 5, the solid line curve represents the change of the negative pressure $V_c$ in the case where the intake air quantity $Q_{air}$ is increased beyond the point A shown in FIG. 4, while the broken line curve represents variation in the negative pressure $V_c$ in the case where the intake air quantity $Q_{air}$ is decreased below the point A. It can be seen from the graphs that variation in the negative pressure is buffered.

FIG. 6 graphically illustrates a variation in the air-fuel ratio of the gas mixture supplied to the engine (at A) in comparison with a variation in the secondary air flow $Q_{2air}$ supplied from the air pump. It will be seen that upon transition from the slow speed operation to the high speed operation state or vice-versa, both the air-fuel ratio and the secondary air quantity will be changed slowly, i.e. with a time delay.

FIG. 7 graphically illustrates the relationship between the air number (or excess-air ratio) λ detected by the oxygen sensor and the intake air quantity $Q_{air}$. As will be seen from the graph, control is effected such that the air number or excess-air ratio λ remains substantially equal to 1 over the entire operation range from the low speed to the high speed operation state. Under this condition, the three-way catalyst will act most effectively to optimally purify the exhaust gas. In the low speed region below the point A, the gas mixture supplied to the engine 1 is rich, as can be seen from FIG. 4.

Accordingly, it seems that the air number or excess-air ratio λ must be decreased. However, since a correspondingly increased quantity of secondary air is supplied at that time, the value of λ at the downstream of the reactor 3 is maintained substantially equal to 1 even in the operation region below the point A, as is shown in FIG. 7.

FIG. 8 shows in detail an arrangement of the control circuit 6 shown in FIG. 1. Referring to FIG. 8, the control circuit 6 for controlling the electromagnetic valve 7A of the negative pressure generator 7 comprises an amplifier 30 for amplifying the output signal from the oxygen sensor 4, a comparator 32 for comparing the output from the amplifier 30 with a reference voltage, a proportional and integral control amplifier (PI control amp.) 34 for altering the output signal from the comparator 32, an oscillator 36 for generating a triangular waveform signal of a predetermined frequency, a pulse generator 38 for producing a rectangular waveform signal of the same period T as that of the triangular wave signal, an adder (or level converter) 40 for adding a predetermined voltage level to the output signal from the PI control amplifier 34 when the throttle switch 21 is closed, and an amplifier 42 for amplifying the output from the pulse generator 38.

Now, the operation of the control circuit 6 of the arrangement described above will be explained by referring to the waveform diagrams shown in FIG. 9. As is well known, the output voltage available from the oxygen sensor 4 disposed in the exhaust manifold 22 characteristically becomes significantly different across the stoichiometric air-fuel ratio (ca. 14.7). More specifically, the magnitude of the output signal from the oxygen sensor 4 is increased in the region below the stoichiometric air-fuel ratio and is decreased in the region beyond that ratio. Accordingly, it can be easily and accurately detected by comparing the output voltage from the oxygen sensor 4 with the reference voltage at the comparator 32 whether the actual air-fuel ratio produced by the carburetor 2 is smaller or greater than the stoichiometric air-fuel ratio. Assuming now that the actual air-fuel ratio is smaller than the stoichiometric one, i.e. as long as the output voltage from the oxygen sensor 4 represented by a solid line curve in FIG. 9 at (A) is higher than the reference voltage, the PI control amplifier 34 produces an output signal whose amplitude continues to be increased as indicated schematically by a dotted-broken curve in FIG. 9 at (C). When the throttle switch 21 is closed (i.e. in the ON-state), a voltage $V_D$ of a predetermined magnitude is added by the adder (level converter) 40, whereby the output signal from the PI control amplifier 34 is shifted by $V_D$ as indicated by a solid line curve in FIG. 9 at (B). Although the oscillator 62 generates a signal of a continuous triangular waveform having a constant amplitude at a constant frequency (refer to FIG. 9 at (D)), the width of the individual pulses produced by the pulse generator 66 will increase as illustrated at (D) in FIG. 9 as long as the amplitude of the output signal from the adder 40 is increased. On the contrary, when the amplitude of the output signal from the adder 40 is decreased, the pulse width of the pulse signal produced from the pulse generator 66 is also decreased. When the pulse train shown at (E) in FIG. 9 is applied to the electromagnetic coil 7B of the negative pressure generator 7 through the amplifier 42, the valve element 7A is moved nearer to the orifice 25. In this manner, as the duty factor t/T of the valve 7A is increased, then the negative pressure approaches atmospheric pressure, as is shown in FIG. 2.

In the case where the output signal from the oxygen sensor 4 varies at a short period as indicated by the dotted line curve in FIG. 9 at (A) (this is the state in which the feedback control utilizing the output from the oxygen sensor is ideally operative), there is produced a voltage signal which varies with a very small amplitude about the output voltage level $V_{\lambda=1}$ of the amplifier 34 corresponding to $\lambda=1$ (i.e. when the switch 21 is closed), as indicated by a dotted curve in FIG. 9 at (B). In a similar manner, when the switch 21 is opened, the corresponding voltage signal varies with a small amplitude about the output voltage level $V'_{\lambda=1}$.

Assuming now that the detection signal produced by the oxygen detector 4 is of a magnitude corresponding approximately to the stoichiometric air-fuel ratio ($\lambda=1$), the negative pressure takes a value of $V_{c\lambda=1}$ indicated in FIG. 2 in the low speed region, i.e. when the switch 21 is closed, while the negative pressure takes a value of $V'_{c\lambda=1}$ when the region detector switch 21 is opened. The valve opening degrees of the actuators at these negative pressure levels are illustrated in FIG. 3.

Assuming next that the oxygen sensor 4 produces a signal "LEAN" representative of a lean fuel-air mixture in the low speed region, i.e. when the switch 21 is closed, then the negative pressure $V_c$ will be increased because of decreasing in the duty factor t/T, resulting in that the opening degrees or areas of the actuators $AC_1$ and $AC_3$ become decreased, while the opening area of the actuator $AC_2$ is increased. As a consequence, the detection signal produced by the oxygen sensor 4 is now a signal "RICH" representative of a rich fuel-air mixture. To the contrally, when the oxygen sensor 4 produces the signal "RICH", the opening areas of the actuators $AC_1$ and $AC_3$ are decreased with that of the actuator $AC_2$ being concurrently increased, resulting in that the air-fuel ratio A/F is shifted in the direction toward "LEAN" by the output signal from the oxygen sensor 4. In this manner, the normal feedback control is effected on the basis of the detection signal from the oxygen sensor. The opening of the switch 21 merely brings about the shifting of the negative pressure from the level $V_{c\lambda=1}$ to $V'_{c\lambda=1}$ when $\lambda=1$. The control operations are determined from the characteristic diagram shown in FIG. 3. The valve of the actuator $AC_3$ is in a substantially fully closed state at that time. The ranges within the negative pressure varies are indicated by $\Delta V$ (in the case where the switch 21 is closed) and $\Delta V'$ (in the case where the switch 21 is opened) in FIG. 3. Values of $\Delta V$ and $\Delta V'$ define the range within which the output voltage from the amplifier 34 is allowed to vary. Reference is to be made to FIG. 9 at (B) and (C).

In the low speed region in which the switch 21 is closed, the opening areas of the actuators $AC_1$ and $AC_2$ are increased more as compared with the case where the switch 21 is opened, which means that the slow air bleed is in the state "LEAN" and that the secondary air quantity supplied to the reactor is increased. Accordingly, it may appear on the face of it that supply of an enriched fuel-air mixture could not be realized in the region below the point A shown in FIG. 3. However, the supply of the enriched fuel-air mixture to the engine is rendered possible even in the low speed region shown in FIG. 4 by setting the carburetor so that the opening area $SAC_1$ of the actuator $AC_1$ provides a desired air-fuel ratio (e.g. $\lambda=0.8$) at the negative pressure $V_{c\lambda=1}$.

Under this condition, when the switch 21 is turned off, it may appear that the opening area of the actuator $AC_1$ is decreased to reduce the air-fuel ratio and thus the fuel-air mixture is enriched in contradiction to the aimed effect. However, in reality, the main fuel system ($AC_2$) will play a dominant role in the high speed range where the switch 21 is opened. Consequently, enriching the fuel mixture to a slight degree in the low speed fuel system will exert no significant influence on the overall fuel-air mixture supplied to the engine to thereby allow the desired air-fuel ratio ($\lambda=1$) to be maintained, provided that the main fuel system is arranged so that the opening area $SAC_2$ of the actuator $AC_2$ at the negative pressure $V'_{c\lambda=1}$ provides the desired air-fuel ratio (e.g. $\lambda=1$) in the high speed region.

By virtue of the control operation described above, the composition of the exhaust gas brought into contact with the oxygen sensor can be controlled so as to be substantially invariable independently from the intake air quantity of the internal combustion engine. At that time, the composition of the exhaust gas can be controlled so that $\lambda=1$. The fuel-air mixture supplied from the carburetor 1 is in the enriched state "RICH" in the low speed region where the intake air quantity is small, while the normal air-fuel ratio is maintained in the high speed region beyond the point A (FIG. 4), whereby the engine operation can be maintained in the desirable condition over its entire operation range. In the high speed region, no secondary air supply takes place. In the vicinity of the point A, both the low speed fuel system and the high speed fuel system operate as being accompanied by respective time delays.

As will be appreciated from the foregoing description, the air-fuel ratio control apparatus according to the preferred embodiment of the invention allows the composition of the exhaust gas to be controllably adjusted so that the performance or capability of the three-way catalyst can be fully utilized without deteriorating the operating condition of the engine by controlling the fuel quantity for low speed operation, the main fuel quantity and the secondary air supply through three diaphragm valves or actuators ($AC_1$, $AC_2$, $AC_3$) in dependence on the negative pressure produced in response to the output signal from the oxygen sensor which serves to detect the composition of the exhaust gas resulted from recombustion in the thermal reactor 3. Thus, the combustion product or exhaust gas discharged from the internal combustion engine can be significantly purified according to the teachings of the invention.

We claim:

1. An air-fuel ratio control apparatus for an internal combustion engine comprising: a carburetor including a low speed fuel system and a main fuel system and serving for controlling the air-fuel ration of a fuel-air mixture supplied to said internal combustion engine; a thermal reactor in which exhaust gas from said internal combustion engine is reacted with secondary air supplied to said reactor; a three-way catalyst tube connected to said thermal reactor; an exhaust gas composition sensor disposed in an exhaust passage between said thermal reactor and said three-way catalyst tube; a control circuit for producing a control signal in response to the output signal from said sensor; a negative pressure generator for producing a negative pressure in response to said output signal from said control circuit; means for controlling said low speed fuel system and said main fuel system, respectively, in response to said negative pressure produced from said negative pressure generator; means for controlling the quantity of said secondary air supply in response to the negative pressure produced from said negative pressure generator: and means, responsive to the speed of operation of said engine and, upon detecting that the engine is operating in a high speed of operation region, for generating an output signal which is applied to said control circuit and causes said control circuit to control said negative pressure generator so as to reduce the quantity of said secondary air supply.

2. An air-fuel ratio control apparatus according to claim 1, wherein said means for controlling said low speed fuel system is adapted to control in inverse proportion to said negative pressure an opening area of a bypass slow air bleed through an actuator operated by said negative pressure produced by said negative pressure generator.

3. An air-fuel ratio control apparatus according to claim 1, wherein said means for controlling said main fuel system is adapted to control in direct proportion to said negative pressure an opening area of a bypass main jet through an actuator operated by said negative pressure produced by said negative pressure generator.

4. An air-fuel ratio control apparatus according to claim 1, wherein said means for controlling the secondary air supply is adapted to control a flow sectional area of said secondary air supply through an actuator operated by the negative pressure produced from said negative pressure generator in inverse proportion to said negative pressure in the low speed region of said internal combustion engine and maintain a predetermined small flow sectional area in the high speed region of said engine.

5. An air-fuel ratio control apparatus according to claim 1, wherein said control circuit includes a comparator for comparing the output signal from said exhaust gas composition sensor with a reference voltage, an integrator for integrating the output signal from said comparator, an adder for adding to the output signal from said low and high speed rotation region detector the output signal from said integrator, and a pulse generator for producing a pulse signal having a pulse width corresponding to the output signal from said adder.

6. An air-fuel ratio control apparatus according to claim 1, wherein said negative pressure generator is constituted by a three-way electromagnetic valve device including an electromagnetic valve for controlling the ratio at which the negative pressure produced from a constant negative pressure source is mixed with the atmospheric pressure.

7. An air-fuel ratio control apparatus for an internal combustion engine comprising: a carburetor including a low speed fuel system and a main fuel system and serving for controlling the air-fuel ratio of a fuel-air mixture supplied to said internation combustion engine; a thermal reactor in which exhaust gas from said internal combustion engine is reacted with secondary air supplied to said reactor; a three-way catalyst tube connected to said thermal reactor; an exhaust gas composition sensor disposed in an exhaust gas passage between said thermal reactor and said three-way catalyst tube; a control circuit for producing a control pulse signal having a pulse width corresponding to the output signal from said sensor; a negative pressure generator for producing a negative pressure in response to said control pulse signal from said control circuit; a detector for detecting a low speed operation region and a high speed operation region of said internal combustion engine and adapted to produce an output signal which is applied to said control circuit to alter the level of said control signal so that said internal combustion engine is supplied with a fuel-air mixture of a low air-fuel ratio when said region detector indicates that said engine is operating in the low speed region, while said engine is supplied with a fuel-air mixture of an approximately stoichiometric air-fuel ratio when said region detector indicates that said engine is operating in the high speed region; means for controlling said low speed fuel system and said main fuel system, respectively, in response to the negative pressure produced by said negative pressure generator; and means for controlling said second air supply in response to the negative pressure produced by said negative pressure generator in such manner that the secondary air supply to said thermal reactor is increased when said operation region detector indicates that said engine is operating in said low speed region, while a constant and small quantity of secondary air is supplied to said thermal reactor when said operation region detector indicates that said engine is operating in a high speed region.

8. A method of controlling an air-fuel ratio control apparatus for an internal combustion engine which comprises a carburetor including a low speed fuel system and a main fuel system and adapted to control the air-fuel ratio of a fuel-air mixture supplied to said engine, a thermal reactor in which exhaust gas discharged from said engine is caused to react with secondary air supplied to said reactor, an exhaust gas composition sensor disposed in a discharge passage extending from said thermal reactor, a negative pressure generator for producing a negative pressure in response to the output signal from said exhaust gas composition sensor, and a detector for detecting a low speed and a high speed rotation region of said internal combustion engine; comprising the steps of:

detecting the air number (excess-air ratio) of said exhaust gas by means of said exhaust gas composition sensor;

producing a control pulse signal having a pulse width varying in correspondence to the detected air number (excess air ratio) and varying the pulse width stepwise in response to the output signal from said operation region detector;

varying the negative pressure produced by said negative pressure generator in accordance with said control pulse signal;

controlling said low speed fuel system and said main fuel system in response to the negative pressure produced by said negative pressure generator in such a manner that the fuel-air mixture of low air-fuel ratio is supplied to said engine when said operation region detector indicates that said engine is operating in the low speed region, while the fuel-air mixture having an approximately stoichiometric air-fuel ratio is supplied to said engine when said operation region detector indicates that said engine is operating in the high speed region; and controlling the quantity of said secondary air supply in response to the negative pressure produced by said negative pressure generator in such a manner that said secondary air supply to said thermal reactor is increased when said operation region detector indicates that said engine is operating in the low speed region, while a constant and smaller quantity of secondary air is supplied to said thermal reactor when said operation region detector indicates that said engine is operating in the high speed operation region;

wherein the fuel-air mixture having a lower air-fuel ratio than the stoichiometric air-fuel ratio is supplied to said engine with the secondary air supply to said thermal reactor being concurrently increased when said engine is operating in the low speed operation region, while in the high speed operation region of said engine the fuel-air mixture having the approximately stoichiometric air-fuel ratio is supplied to said engine with the secondary air supply to said thermal reactor being controllably adjusted to a constant and smaller quantity.

* * * * *